United States Patent
Gouguenheim et al.

(10) Patent No.: US 7,802,109 B2
(45) Date of Patent: Sep. 21, 2010

(54) TRUSTED SYSTEM FOR FILE DISTRIBUTION

(75) Inventors: Christoph Gouguenheim, Moutain View, CA (US); Kan Zhang, Palo Alto, CA (US); Salil Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1930 days.

(21) Appl. No.: 10/733,434

(22) Filed: Dec. 10, 2003

(65) Prior Publication Data

US 2005/0132204 A1    Jun. 16, 2005

(51) Int. Cl.
*H04L 9/14* (2006.01)
*G06F 21/00* (2006.01)

(52) U.S. Cl. ...................... 713/193; 380/277
(58) Field of Classification Search .................. 705/51, 705/56; 713/185, 193, 172; 726/9, 5, 10, 726/20; 318/281

See application file for complete search history.

(56) References Cited

U.S. PATENT DOCUMENTS

| | | | |
|---|---|---|---|
| 6,289,455 B1* | 9/2001 | Kocher et al. | 705/51 |
| 6,560,651 B2* | 5/2003 | Mott et al. | 705/56 |
| 6,868,403 B1* | 3/2005 | Wiser et al. | 705/51 |
| 7,178,025 B2* | 2/2007 | Scheidt et al. | 713/168 |
| 7,194,092 B1* | 3/2007 | England et al. | 705/56 |
| 7,337,332 B2* | 2/2008 | Tsuria et al. | 713/193 |
| 2003/0005333 A1* | 1/2003 | Noguchi et al. | 713/201 |
| 2003/0046568 A1* | 3/2003 | Riddick et al. | 713/193 |

* cited by examiner

*Primary Examiner*—Gilberto Barron, Jr.
*Assistant Examiner*—Izunna Okeke

(57) ABSTRACT

A secure token includes a processor for protecting a first cryptographic key against unauthorized access, and creating a second cryptographic key from the first key and a message unique to an insecure device. The second key is usable for file decryption by the insecure device.

31 Claims, 6 Drawing Sheets

TRUSTED SYSTEM FOR FILE DISTRIBUTION

BACKGROUND

The Internet has become a powerful medium for distributing multimedia, documents, and other content. Quickly and conveniently, users can download files from servers using client-server applications, and transfer files among other peers using peer-to-peer (P2P) applications.

One popular use of the Internet is sharing of multimedia files. P2P applications such as Kazaa and Morpheus allow users to share CD-quality music, images, and video.

However, these P2P applications also allow users to obtain the multimedia without paying for it. In certain instances, such file sharing can be unlawful.

The problem with file sharing is not limited to multimedia. It can also apply to documents. For example, a confidential document is obtained lawfully or unlawfully, and published for all to see on the Internet. Privacy rights and property rights can be compromised.

Stated more generally, the problem concerns the control of access rights. Authorized users (that is, those users having access rights) should be allowed access, and unauthorized users should be denied access. When an authorized user receives access rights, that authorized user should be prevented from sharing those access rights with unauthorized users.

Legal remedies have been sought to address this problem. For example, legal action was used to stop Napster. However, the legal remedies tend to eliminate powerful file distribution applications and force content to be distributed via less efficient distribution channels (e.g., "brick and mortar" stores").

It would be desirable to control access rights, without discouraging use of these P2P applications. The Internet is a powerful distribution medium, and its use should not be discouraged.

A separate problem concerns the transfer of a user's access rights from one platform to another. Multimedia and documents can be displayed on all sorts of devices, some of which are portable. For example, MP3 files can be played on desktop computers, PDAs, MP3 players, notebook computers, etc. Mobile users should be able to carry their access rights and use those access rights wherever they go. It would be desirable to have a system that allows an authorized user to easily transfer his or her access rights from one platform to another.

SUMMARY

According to one aspect of the present invention, a secure token includes a processor for protecting a first cryptographic key against unauthorized access, and creating a second cryptographic key from the first key and a message unique to an insecure device. The second key is usable for file decryption by the insecure device.

According to another aspect of the present invention, a trusted system for distributing files includes an insecure device; and a trusted secure device. The secure device can store a first cryptographic key, access a message from the insecure device, create a second cryptographic key from the message and the first key, and allow the insecure device to access the second key. The first key grants access rights to a file. The insecure device is not allowed to access the first key. The insecure device can use the second key for decryption.

Other aspects and advantages of the present invention will become apparent from the following detailed description, taken in conjunction with the accompanying drawings, illustrating by way of example the principles of the present invention.

DETAILED DESCRIPTION

Figure 1:
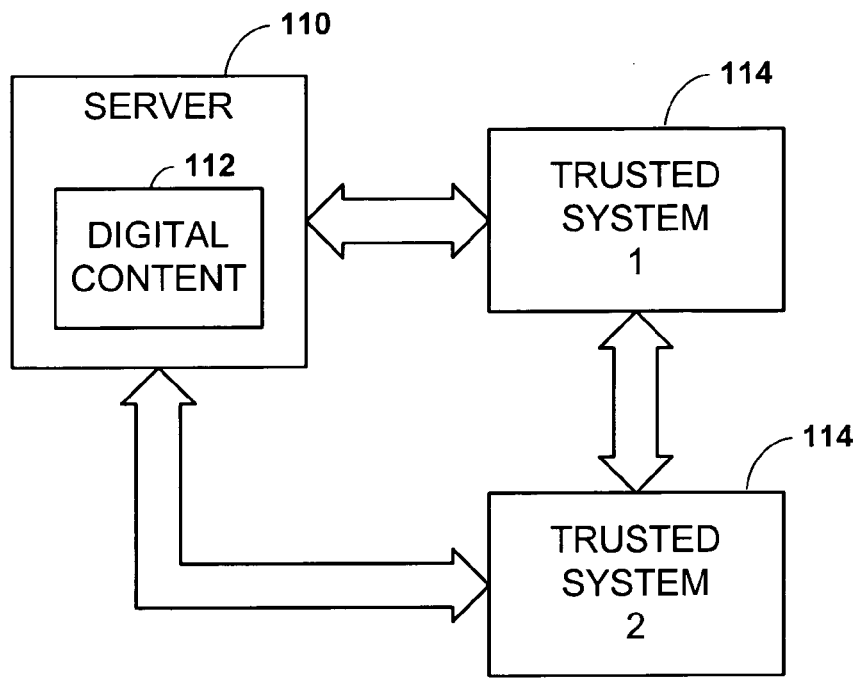
FIG. 1 is an illustration of a media transaction architecture in accordance with an embodiment of the present invention.

As shown in the drawings for purposes of illustration, the present invention is embodied in a system including a trusted secure device and an insecure device. The secure device makes it infeasible, impractical or impossible to access certain data stored therein. For example, the secure device may implement a certain level of tamper-resistance, as well as a certain quality of cryptography. The secure device is trusted because it behaves in a specified manner. That is, the secure device is trusted because it does what it is supposed to do. The system is trusted and secure, even though it includes an insecure device.

First a trusted system for a specific application—media transactions—will be described. Afterward, a trusted system for a more general application—file distribution—will be described.

Reference is made to FIG. 1, which illustrates an architecture for media transactions. A media server 110 stores digital content 112 including media files. For example, the media files may include audio and video files.

The media server 110 may be owned by a media provider. The media provider can sell a media file to any one of a number of customers. A sale of a media file includes granting access rights to the media file. Access rights might include, for example the right to play the media file. However, the access rights might not include the right to distribute the media file.

A customer can use a trusted media transaction system 114 to buy or sell media files from the media server 110 or from another trusted system 114. Each trusted system 114 includes a secure token (e.g., a smart card) and a media player (the media player is not secure or trusted). The secure token includes a processor that is programmed to perform transactions with the media server 110 (which is also secure and trusted). The secure token is also programmed to perform peer-to-peer transactions with secure tokens of other trusted systems 114.

The secure tokens are trusted by the media provider to perform authorized transactions with other secure tokens and transfer access rights to other secure tokens. The secure tokens are trusted not to allow unauthorized sharing of access rights or any prohibited activities.

Access rights to a media file are transferred to a trusted system 114 by transferring a cryptographic key associated with the media file. The cryptographic key is stored in the secure token of the trusted system. For example, the cryptographic key may be transmitted to the secure token in a secure manner, or a secure token storing the cryptographic key may be given to a customer by the media provider.

Figure 2:
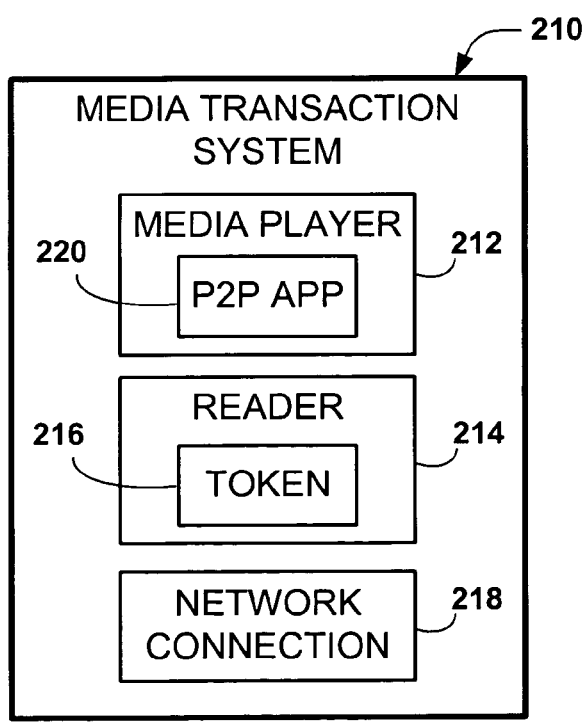
FIG. 2 is an illustration of a media transaction system in accordance with an embodiment of the present invention.
Figure 3:
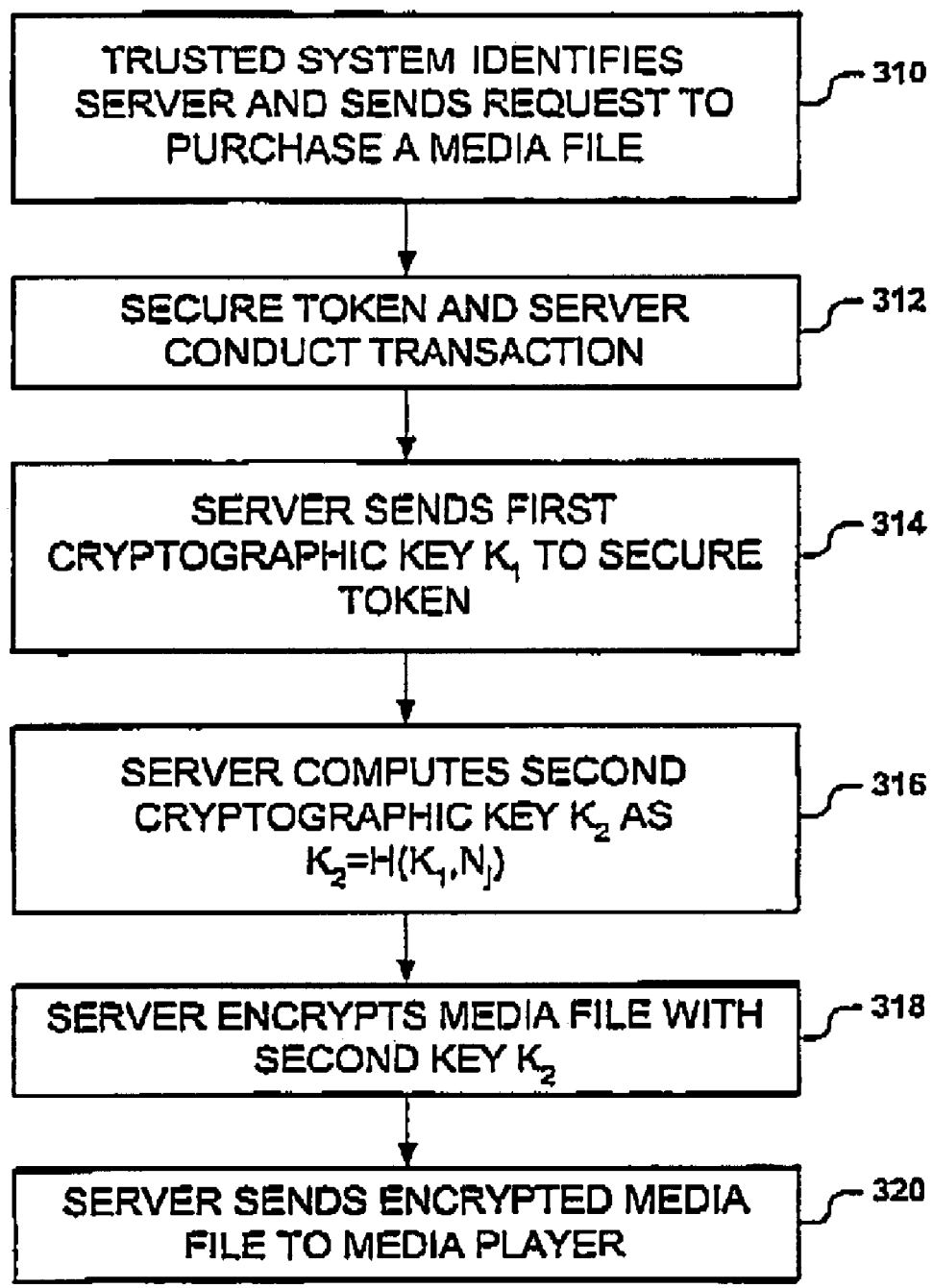
FIGS. 3-5 are illustrations of media transactions in accordance with an embodiment of the present invention.
Figure 4:
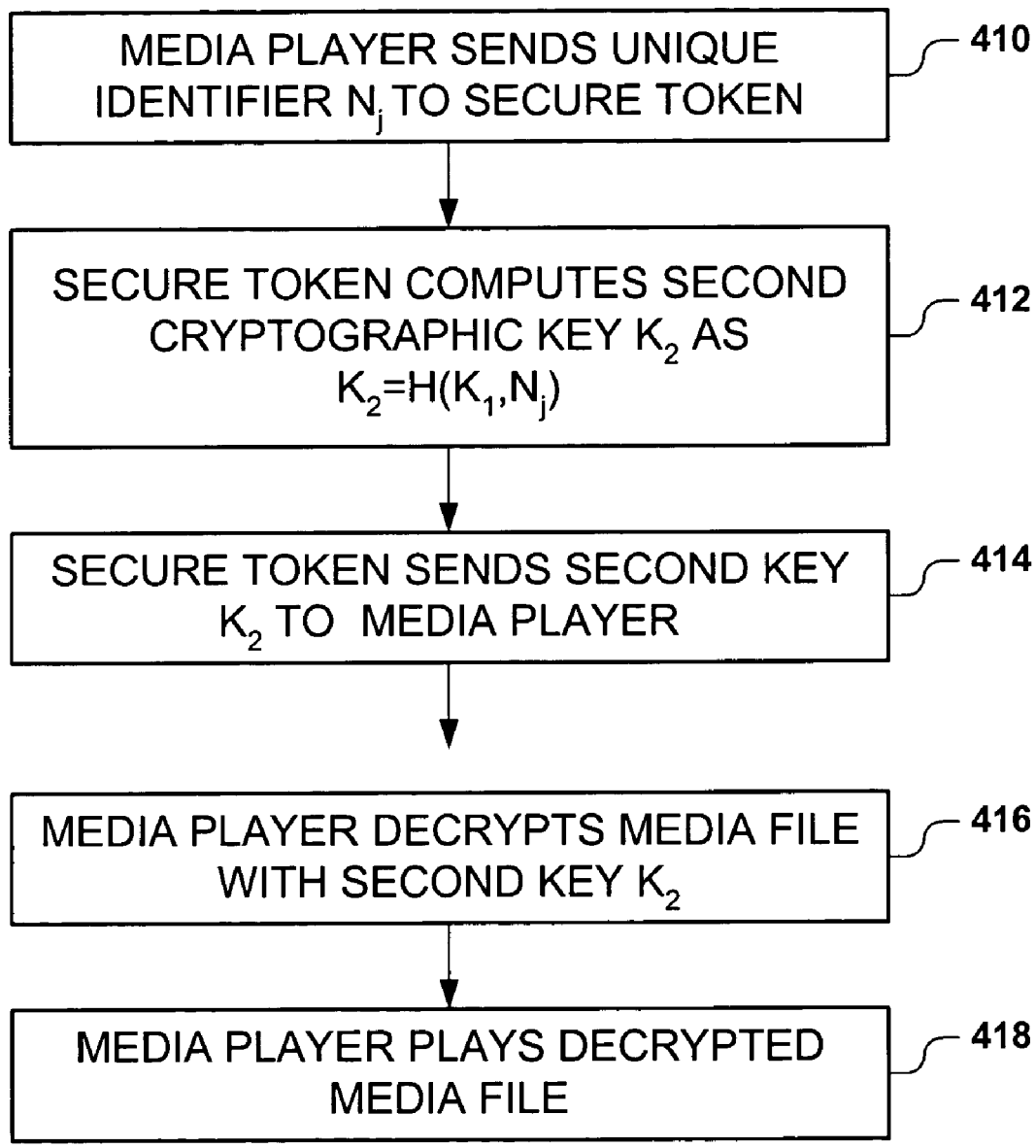

Exemplary media transactions are illustrated in FIGS. 3-4. These media transactions may be performed with trusted systems 210 having the configuration shown in FIG. 2. The trusted media transaction system 210 of FIG. 2 includes an insecure media player 212, a token reader 214 (e.g., a smart card reader), a trusted secure token 216, and an 802.11 wireless network interface (e.g., a wireless LAN card) 218. Stored in the media player 212 is a P2P application 220 for sharing media files with other users.

The exemplary media transactions will also be described for a Data Rights Management (DRM) server. A variety of media files are stored on the server.

Reference is made to FIG. 3, which illustrates a method of buying a media file from the DRM server. The trusted system connects to the Internet via the network interface and uses the P2P application or a client server application to identify the server having the media file. The insecure media player sends its unique identifier $N_j$ to the server, as well as a request to purchase the media the (310).

The secure token and the server conduct a transaction for the purchase of the media file (312). The secure token may store information (e.g., checking account information) that allows a point of sale purchase to be made.

The server computes or accesses a first cryptographic key $K_1$ for the media file and sends the first key $K_1$ to the secure token in a secure manner (314). For example, the secure token and the server can use a pre-installed authentication key to authenticate each other and set up a session key to encrypt the communication between them.

The first key $K_1$ is stored in the secure token. The first key $K_1$ may be characterized as a license to play the media file. Whoever possesses the first key $K_1$ has the right to play the media file on any media player. Thus the license is tied to the secure token.

Since the first key $K_1$ is stored securely in the secure token, unauthorized sharing of the first key $K_1$ is prevented. Moreover, the insecure media player does not have authorization to access the first key $K_1$. It never sees the first key $K_1$.

The server uses a secure hash function to generate a second cryptographic key $K_{2,j}$ from the unique identifier $N_j$ and the first key $K_1$ (316). That is, $K_{2,j}=H(K_1, N_j)$, where $H()$ is the hash function. A property of the hash function $H()$ on an n-bit message makes it computationally infeasible to extract the first decryption key $K_1$ from the second decryption key $K_2$, even with knowledge of the message N, provided that the message is sufficiently long. For example, the message N may a length of 64-bits. A secure hash function such as MD5 or SHA-1 may be used.

The server encrypts the media file with the second key $K_{2,j}$ (318). As a result, the encrypted media file is tied to a specific media player.

The server sends the encrypted media file to the media player (320). At this point, the media player is ready to decrypt the media file.

Reference is now made to FIG. 4, which illustrates a method of playing the encrypted media file. The media player sends its unique identifier $N_j$ to the secure token (410). Using the same hash function used by the server, the secure token computes the second key $K_{2,j}$ from the unique identifier $N_j$ and the first key $K_1$ (412) and sends the second key $K_{2,j}$ to the media player (414). Using the second key, the media player decrypts the encrypted media file (416). The media play can now play the decrypted file (418).

Figure 5:
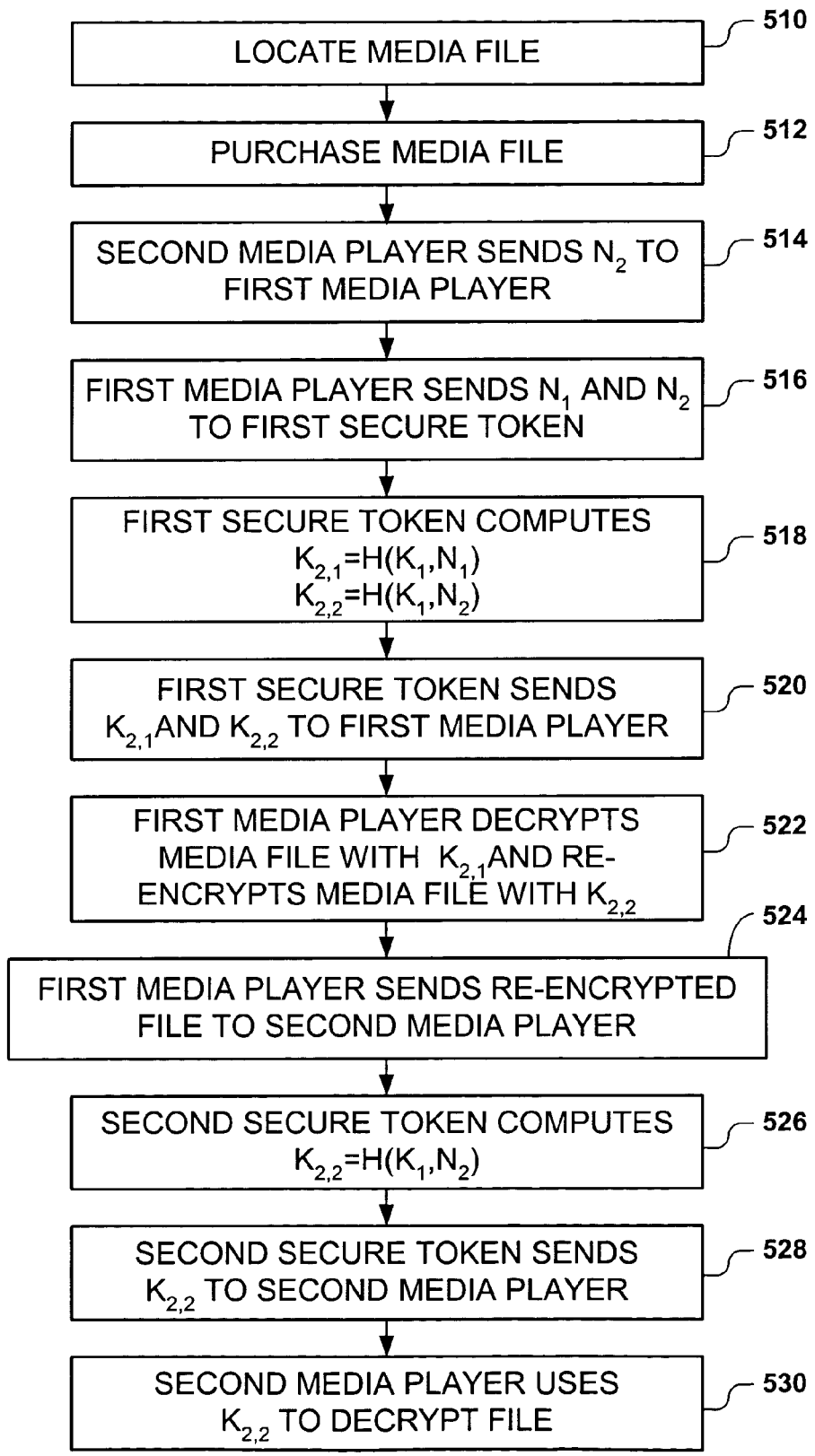

FIG. 5 illustrates a peer-to-peer transaction between a first trusted system and a second secure system. The peer-to-peer transaction allows the owner of one secure token to perform an authorized transfer of access rights to the owner of another secure token. The secure tokens for the first and second trusted systems will be referred to as the first and second tokens, and the insecure media players of the trusted systems will be referred to as the first and second media players.

The second trusted secure system uses its P2P application to identify a peer having a specific media file (510). In this example, the first trusted system is identified by the P2P application.

The second token connects to the first token, and conducts a transaction to purchases the first key $K_1$ for the media file (512). This transaction might involve a payment directly or indirectly to a third party such as a copyright owner.

Once the transaction has been completed, the second media player sends its unique number $N_2$ to the first media player (514). The first media player sends this number $N_2$ to the first secure token, along with its own unique number $N_1$ (516).

The first token computes a second key $K_{2,1}$ from the first key $K_1$ and its unique number $N_1$ (518). The first token also computes a third key $K_{2,2}$ from unique number $N_2$ and the first key $K_1$ (518). The second and third keys $K_{2,1}$ and $K_{2,2}$ are sent to the first media player (520).

The first media player accesses the media file (e.g., downloads the media file from the server), decrypts the media file with the second key $K_{2,1}$ and re-encrypts the media file with the third key $K_{2,2}$ (522). The re-encrypted media file is sent to the second media player (524).

The second secure token computes the third key $K_{2,2}$ from the first key $K_1$ and the unique identifier $N_2$ of the second media player (526). The third key $K_{2,2}$ is sent to the second media player (528), which uses the third key $K_{2,2}$ to decrypt the media file (530).

Because the media players are not secure, an attacker might be able to break into one of the media players, and publish the second and third keys. However, the damage is limited. The attacker can use the second key to decrypt the encrypted media file stored on the first media player, but not an encrypted media file on the second media player or any other media player. Similarly, the attacker can use the third key to decrypt the encrypted media file stored on the second player but not the first media player or any other media player.

Moreover, it is likely that the insecure media player will not be compromised since there is a cost associated with breaking into it. This cost in all likelihood will not justify the benefits of obtaining free music. The cost of breaking into an insecure media player can be made very high if the media player is implemented on a Trusted-Computing platform.

Further, integrity of the first key is not affected if either the second key or the third key is hacked. The hash function makes it infeasible, impractical, or impossible to determine the first key from the second or third keys. Consequently, the key distribution scheme is preserved.

Peer-to-peer sharing of encrypted media files does not transfer access rights from one system to another. The distribution of access rights (in terms of the first key $K_1$) is independent of the distribution of the encrypted media files. The media files are encrypted differently for different systems and can be distributed freely, while the access rights are transferred by transferring the first key $K_1$ through secure transactions via the secure tokens.

The owner of a secure system can carry his or her access rights in the secure token. The token can be removed from the media player and used with another media player. The owner can use the access rights to receive an encrypted file that is specific to the other media player.

However, the owner cannot share the access rights with other owners in an unauthorized manner. The secure token is trusted not to allow unauthorized sharing of access rights.

These examples of media transactions illustrate how the architecture of FIG. 1 makes it easier to distribute media, while protecting the rights of content owners. Access rights are transferred simply by distributing cryptographic keys. This approach is especially beneficial to the distribution of multimedia and other large files. For example, 1000 keys for 1000 songs could be distributed on a single trusted token (the encrypted songs could be distributed over the Internet), instead of distributing 1000 unencrypted songs on 100 CDs.

There is another benefit of using a trusted token in the trusted system: the computational burden of performing decryption is assumed by the insecure device, not the secure token. Thus the secure token can have far less computational power than the insecure device. For instance, a secure token such as a smart card need not have sufficient processing power to perform on-the-fly decryption of MP3 files. Reducing the computational power of the secure token can reduce its cost and power consumption, among other things.

The trusted system could be used to perform the transactions described in U.S. Ser. No. 10/428,810, filed May 1, 2003, the specification of which is incorporated herein by reference. However, the transaction of digital media is but one application for a trusted system according to the present invention.

A trusted system according to the present invention can be used to control access rights to electronic books, limit access to confidential documents, restrict the use of digital files, etc. In general, a trusted system according to the present invention can be used for file distribution. The file distribution system can be used to control file access (number of views, length of views), altering, sharing, copying, printing, and saving.

A trusted file distribution systems will now be described. The trusted file distribution system described below can be configured for media transactions or other types of file distribution.

Figure 6:
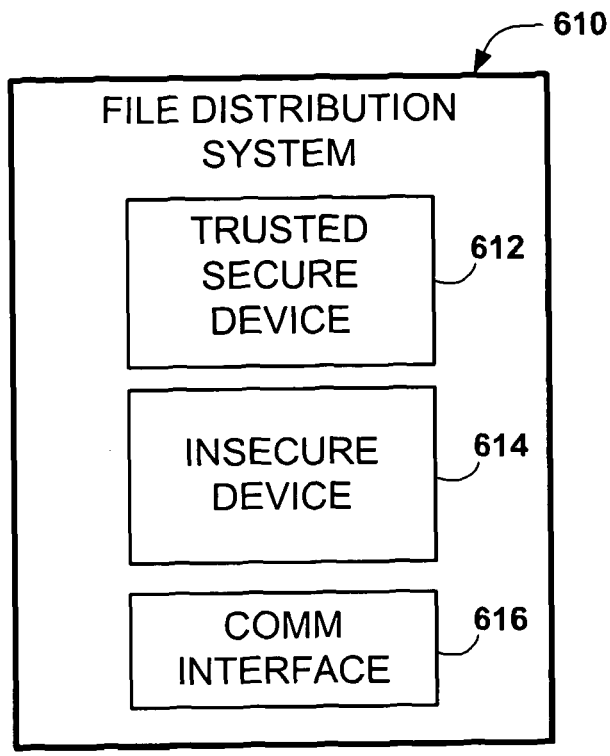
FIG. 6 is an illustration of a file distribution system in accordance with an embodiment of the present invention.

Reference is made to FIG. 6, which illustrates a trusted file distribution system 610 including a trusted secure device 612 and an insecure device 614. The secure device 612 stores data in a secure manner. The secure device 612 makes it infeasible, impractical or impossible to access the securely stored data without authorization. The secure device 612 is not limited to any particular type. As a first example, the secure device 612 can be a smart card. As a second example, the secure device 612 can be secure digital (SD) memory.

As a third example, the secure device 612 can be a device that runs Trusted Computing (TC)-certified software. Such a device provides a TC platform. An exemplary TC platform may provide asymmetric key functions for on-chip key pair generation using a hardware random number generator; private key signatures; and public key encryption and private key decryption of keys enable more secure storage of files and digital secrets. This may be accomplished through hardware-based protection of the symmetric keys associated with software-encrypted files (data, passwords, credit card numbers, etc.) and private keys used for digital signatures.

The insecure device 614 is not limited to any specific type of machine. The insecure device 616 may be a general-purpose machine that is programmed to perform decryption among other functions. Examples of a general purpose device include without limitation a personal digital assistant (PDA) or other type of handheld computer, and a desktop personal computer. The insecure device 614 may be a specific-purpose machine that can perform decryption among other functions. Examples of specific-purpose machines devices 614 include, without limitation, an MP3 player, a stereo system, a car radio player (in the framework of digital media transactions), an electronic book reader or other device able to display a document.

The insecure device 614 can also be implemented on a Trusted Computing platform. This may be done to discourage attackers from hacking into the insecure device 614, and to increase the overall security of the trusted system.

The trusted file distribution system 610 further includes a communication interface 616. For example, the communications interface 616 may allow a wired or wireless connection to a network (e.g., the Internet).

Figure 7:
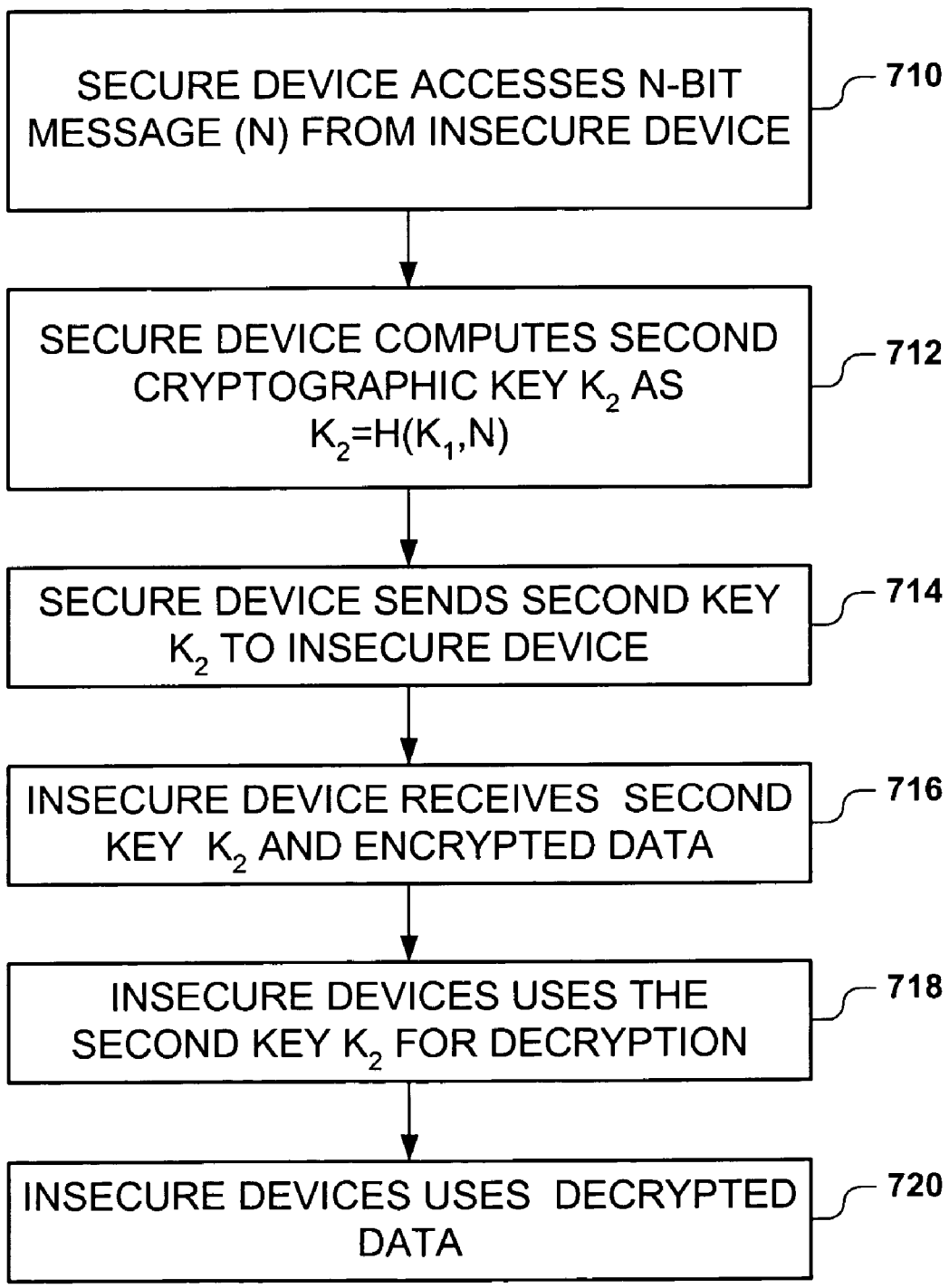
FIG. 7 is an illustration of a file distribution method in accordance with an embodiment of the present invention.

Additional reference is made to FIG. 7, which illustrates a general method of using the file distribution system. The secure device already stores a first cryptographic key $K_1$. The first key $K_1$ might have been embedded in the secure device during fabrication, stored in the secure device prior to sale of the secure device, or received from an external source in a secure manner and stored in memory of the secure device. A digital certificate may accompany the first key $K_1$. The digital certificate can indicate the access rights associated with the first key $K_1$.

The secure device does not have authorization to access the first key $K_1$. In some embodiments, the first key $K_1$ may be symmetric in that it can be used for encryption and decryption.

The secure device accesses an n-bit message N from the insecure device (710). For example, the secure device may prompt the insecure device to send the message N, or the secure device may read the message from memory of the insecure device.

The message N may identify the insecure device or it may be unique to the insecure device. As a first example, the message may be a serial number of the insecure device. As a second example, the message N may be a password or a randomly generated number sequence stored in memory of the insecure device.

The secure device creates a second decryption key $K_2$ from the message N and the first decryption key $K_1$ (712). The second decryption key $K_2$ may be generated as $K_2=H(K_1,N)$, where $H(\ )$ is a secure hash function.

The secure device sends the second key $K_2$ to the insecure device (714). The insecure device receives the second key $K_2$ from the secure device (716).

The insecure device also receives encrypted data from an external source such as a server (716). The external source already has knowledge of the first key ($K_1$), the message (N), and the hash function used by the secure device. Several examples of how this knowledge is gained were provided above. With this knowledge the external source generates the second key $K_2$ and uses the second key $K_2$ to encrypt the data.

The insecure device uses the second key $K_2$ to decrypt the incoming data (718). The insecure device can then use the decrypted data (720). If the insecure device includes a print engine, the decrypted data may be printed. If the insecure device is a media player, the decrypted data may be played back. If the insecure device is an electronic book reader, the decrypted data may be displayed.

In steps 712-718, symmetric encryption is used. If asymmetric encryption is used, the external source uses a complement of the second key $K_2$ to encrypt the data. For example, the insecure device uses a hash function that generates a key pair including a private key (the second key $K_2$) and a public key (the complement of the second key $K_2$). The external source uses the public key to encrypt the data, and the insecure device uses the private key to decrypt the encrypted data.

The secure device may implement an access control policy of its own (defined by the manufacturer or the media distributors). For example, the policy may specify the maximum rate at which the secure device can be accessed (e.g., once per second). The security policy can limit the damage a malicious untrusted device can cause by using the secure device as an oracle for getting cryptographic keys for different devices.

The insecure device and the second key $K_2$ may be compromised. Yet even if the second key $K_2$ is published, damage will be limited to the insecure device. Because the second key $K_2$ is restricted to only one insecure device, the second key $K_2$ can be used only to decrypt a specific file on that one insecure device. The second key cannot be used to decrypt the file on another insecure device.

Moreover, integrity of the file distribution is not compromised by publication of the second key $K_2$. Publishing the second key $K_2$ would not force a change in the first key $K_1$. Therefore, the same first key $K_1$ can still be used to grant access rights to different authorized users.

As indicated above, the secure device 112 is not limited to any particular type. The secure device could be a personal computer or some other relatively immobile device. However, certain advantages lie with a secure device 112 that has the form of a token. The secure token carries an authorized user's access rights, and allows those access rights to be used with any insecure device that can accept the token.

A secure token such as a smart card is convenient to carry (it may be the size of a credit card), it can be used with a wide range of insecure devices (it can work with any type of untrusted device 114 having a smart card reader), and it is easy to use (an authorized user need only insert his or her smart card into the reader). The smart card allows an authorized user to conveniently use his or her access rights with any secure file distribution system having a smart card reader. For example, an authorized user can insert a smart card in a desktop computer, which stores any number of encrypted MP3 files. The desktop computer can decrypt and play back those MP3 files for which the smart card provides access. When it is time to go on the road, the authorized user can remove the smart card from the desktop computer and insert it into a smart card reader of an MP3 player. Then MP3 player can download any number of encrypted MP3 files but decrypt play back only those MP3 files for which the smart card provides access. Thus the mobile user can carry his or her rights with him and play the media files on the road.

Figure 8:
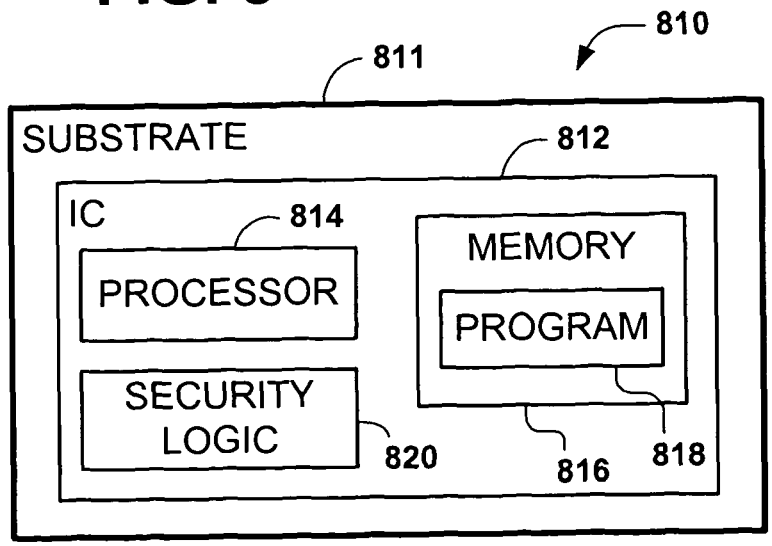
FIG. 8 is an illustration of a secure device in accordance with an embodiment of the present invention.

Reference is now made to FIG. 8, which illustrates an exemplary secure token: a smart card 810. The general design of the smart card 810 may follow ISO standards. The smart card 810 includes a plastic substrate 811 and an integrated circuit 812 mounted on or in the substrate 811. The integrated circuit 812 includes an embedded processor 814 and memory 816. The memory 816 may include one or more of ROM, PROM, EPROM, EEPROM and RAM. A program 818 stored in the memory 816 causes the processor 814 to function as a trusted token.

The smart card 810 also includes security logic 820 for controlling access to the memory 816. The security logic 820 prevents tampering with first keys $K_1$ and any other information stored in the memory 816.

Although specific embodiments of the present invention have been described and illustrated, the present invention is not limited to the specific forms or arrangements of parts so described and illustrated. Instead, the present invention is construed according to the following claims.

What is claimed is:

1. A secure token for use with an encrypted file and an insecure decryption device, the secure token comprising a processor for protecting a first cryptographic key against unauthorized access, and creating a second cryptographic key from the first key and a message unique to the insecure device, the second key usable for file decryption by the insecure device, wherein, in a file transaction with a peer, the secure token is configured to create a third key unique to the peer and send the third key to the insecure device and the peer, and wherein the processor uses a hash function to create the second key from the message and the first key.

2. The secure token of claim 1 wherein the secure token includes a smart card, the smart card including the processor.

3. The secure token of claim 1, wherein the secure token performs an electronic transaction to obtain the first key.

4. The secure token of claim 3, wherein the secure token conducts a transaction with a server to purchase a desired file; and wherein the secure token receives the first key from the server.

5. The secure token of claim 3, wherein the transaction is a transaction of the secure token with the peer to purchase the file; and wherein the secure token receives the first key from the peer.

6. The secure token of claim 3, wherein the transaction is a transaction of the secure token with the peer to sell the file; and wherein the secure token sends the first key to the peer.

7. The secure token of claim 1, further comprising means for receiving the first key and encrypted data, wherein the insecure device uses the second key to decrypt the encrypted data.

8. The secure token of claim 1, wherein processing power of the secure token is significantly less than processing power of the insecure device.

9. An article for a secure device, the secure device including a processor, the secure device used in combination with an insecure device, the article comprising memory encoded with data for instructing the processor to protect a first cryptographic key against unauthorized access, use a hash function to create a second cryptographic key from the first key and a message unique to the insecure device, and send the second key to the insecure device, wherein, in a file transaction with a peer, the processor is configured to create a third key unique to the peer and send the third key to the insecure device and the peer.

10. The article of claim 9, wherein data further instructs the processor to perform an electronic transaction to obtain the first key.

11. The article of claim 10, wherein the secure device conducts a transaction with a server to purchase a desired file; and wherein the secure device receives the first key from the server.

12. The article of claim 11, wherein the transaction is a transaction of the secure device with the peer to purchase a file; and wherein the secure device receives the first key from the peer.

13. The article of claim 11, wherein the transaction is a transaction of the secure device with the peer to sell a file; and wherein the secure device sends the first key to the peer.

14. The article of claim 13, wherein the data further instructs the processor to create the third key.

15. A data rights management server for use with a media transaction system, the server comprising a processing unit programmed to cause the server to establish a secure channel with a smart card, access a unique identifier corresponding to an insecure device, send a first cryptographic key to the smart card via the secure channel, receive a unique identifier from the insecure device, use a hash function to create a second key from the first key and the identifier, encrypt a media file with the second key, and send the encrypted media file to the insecure device, the first key corresponding to the media file, wherein, in a transaction with a peer for the media file, the smart card is configured to create a third key unique to the peer and send the third key to the insecure device and the peer.

16. The server of claim 15, wherein the smart card and the server perform an electronic transaction for the first key.

17. A method of using an insecure decryption device for file distribution, the method comprising:
   accessing a message unique to the insecure device;
   accessing a first cryptographic key;
   creating a second cryptographic key from the message and the first key;
   allowing the insecure device to access the second key but not the first key; whereby the insecure device can use the second key for decryption;
   in a file transaction with a peer, creating a third key that is unique to the peer; and
   in the file transaction, sending the third key to the insecure device and the peer,
   wherein a hash function is used to create the second key from the message and the first key.

18. The method of claim 17, wherein accessing the first key includes performing an electronic transaction to obtain the first key.

19. The method of claim 18, wherein the electronic transaction is conducted with a server to purchase a desired file; and accessing the first key includes receiving the first key from the server.

20. The method of claim 18, wherein the electronic transaction is conducted with the peer to purchase a file; and wherein accessing the first key includes receiving the first key from the peer.

21. The method of claim 18, wherein the electronic transaction is conducted with the peer to sell a file; the method further comprising sending the first key to the peer.

22. An insecure device for use with a secure device and a first cryptographic key, the device comprising:
   means for sending a message to the secure device, the message being unique to the insecure device;
   means for receiving a second cryptographic key from the secure device, the second cryptographic key being created from the message and the first cryptographic key using a hash function;
   means for performing decryption on a media file with the second cryptographic key;
   means for receiving a third cryptographic key derived from a message unique to a peer device, wherein the third cryptographic key is received by the peer device and used by the peer device for decryption; and
   means for encrypting the decrypted media file with the third cryptographic key.

23. The device of claim 22, further comprising means for playing media decrypted with the second cryptographic key.

24. A trusted system for file distribution, the system comprising:
   an insecure device; and
   a trusted secure device for storing a first cryptographic key, accessing a message from the insecure device wherein the message is unique to the insecure device, using a hash function to create a second cryptographic key from the message and the first key, and allowing the insecure device to access the second key, the first key granting file access rights;
   the insecure device not allowed to access the first key, the insecure device using the second key for decryption, wherein, in a file transaction with a peer, the trusted secure device is configured to create a third key unique to the peer and send the third key to the insecure device and the peer.

25. The system of claim 24, wherein the secure device is a secure token.

26. The system of claim 25, wherein the secure token includes a smart card.

27. The system of claim 26, wherein the insecure device includes a media player.

28. The system of claim 24, wherein the secure device is configured to perform an electronic transaction to obtain the first key.

29. The system of claim 24, wherein processing power of the secure device is significantly less than processing power of the insecure device.

30. The system of claim 24, further comprising a peer-to-peer application for identifying peers having desired files.

31. A trusted media transaction system comprising
   an insecure media player device; and
   a trusted secure token for performing an electronic transaction to obtain a first cryptographic key, accessing a message from the insecure device, using a hash function to create a second cryptographic key from the message and the first key, and allowing the insecure device to access the second key, the first key granting media file access rights, wherein the message is unique to the insecure device and, in a file transaction with a peer, the trusted secure token is configured to create a third key unique to the peer and send the third key to the insecure device and the peer;
   the insecure device configured to use the second key for media file decryption.

* * * * *